(12) United States Patent
Choi et al.

(10) Patent No.: US 12,481,145 B2
(45) Date of Patent: Nov. 25, 2025

(54) DIGITAL MICROSCOPE FOR MEDICAL PROCEDURE

(71) Applicants: Sung Baik Choi, Seoul (KR); Dongkyun Lee, Mokpo-si (KR); Hyeon Cheol Kim, Busan (KR); Minjong Roh, Suwon-si (KR)

(72) Inventors: Sung Baik Choi, Seoul (KR); Dongkyun Lee, Mokpo-si (KR); Hyeon Cheol Kim, Busan (KR); Minjong Roh, Suwon-si (KR)

( * ) Notice: Subject to any disclaimer, the term of this patent is extended or adjusted under 35 U.S.C. 154(b) by 28 days.

(21) Appl. No.: 18/231,291

(22) Filed: Aug. 8, 2023

(65) Prior Publication Data
US 2024/0069320 A1 Feb. 29, 2024

(30) Foreign Application Priority Data
Aug. 25, 2022 (KR) .......................... 10-2022-0106708

(51) Int. Cl.
| | |
|---|---|
| *G02B 21/36* | (2006.01) |
| *G16H 30/40* | (2018.01) |
| *H04N 13/128* | (2018.01) |
| *H04N 13/194* | (2018.01) |
| *H04N 13/239* | (2018.01) |
| *H04N 13/293* | (2018.01) |
| *H04N 13/302* | (2018.01) |

(52) U.S. Cl.
CPC ........... *G02B 21/361* (2013.01); *G16H 30/40* (2018.01); *H04N 13/128* (2018.05); *H04N 13/194* (2018.05); *H04N 13/239* (2018.05); *H04N 13/293* (2018.05); *H04N 13/302* (2018.05)

(58) Field of Classification Search
CPC .. G02B 21/0012; G02B 21/22; G02B 21/361; G02B 21/365; G02B 21/368; G16H 30/40; H04N 13/128; H04N 13/194; H04N 13/239; H04N 13/293; H04N 13/302
See application file for complete search history.

(56) References Cited

U.S. PATENT DOCUMENTS

| | | | |
|---|---|---|---|
| 2017/0045727 A1* | 2/2017 | Yang | ........................ G02B 15/02 |
| 2021/0386527 A1* | 12/2021 | Choi | ..................... A61C 9/0053 |

FOREIGN PATENT DOCUMENTS

| | | |
|---|---|---|
| KR | 10-1092108 B1 | 12/2011 |
| KR | 10-2012-0138520 A | 12/2012 |
| KR | 10-1339667 B1 | 12/2013 |

\* cited by examiner

*Primary Examiner* — Jae N Noh
(74) *Attorney, Agent, or Firm* — Revolution IP, PLLC

(57) ABSTRACT

A microscope for a medical procedure includes: image sensors 10 creating image data; a lighting prism 20 transmitting an image of an object, which is input, to the image sensors such that an image is formed; pre-lenses 30 disposed in a pair at both sides behind the lighting prism 20 and enlarging an image of an object, and transmitting the image to the image sensors 10; objective lenses 40 provided in a pair, selectively disposed on virtual axes connecting the pair of pre-lenses 30 and the pair of image sensors 10, respectively; displays 60 provided in a pair and displaying composed image data by integrating image data converted through the image sensors 10; and an image processing unit 70 receiving image data transmitted from the image sensors 10, combining the image data with medical information transmitted from an external server, and transmitting composed image data to the displays 60.

2 Claims, 4 Drawing Sheets

DIGITAL MICROSCOPE FOR MEDICAL PROCEDURE

TECHNICAL FIELD

The present disclosure relates to a digital microscope for a medical procedure and, particularly, to a digital microscope for a medical procedure of which the eyepieces are implemented as digital displays.

BACKGROUND ART

In general, a microscope for a medical procedure is a kind of medical instruments that enables doctors to perform procedures while enlarging and seeing the inside of a human body, which doctors cannot see or cannot easily check, at the fields of surgery, ophthalmology, dental surgery, neurosurgery, otorhinolaryngology, spine surgery, and obstetrics and gynecology of medical institutions. Such microscopes for a medical procedure have an imaging system that enables operating doctors (hereafter, referred to as operators) to see procedure processes through images, that is, a monitor.

Accordingly, operators perform a procedure while observing the diseased parts of patient through a microscope for a medical procedure, and assistants, watchers, and guardians related to patients excluding the operators can observe the diseased part of patients and the procedure processes in an operating room or at the outside through an imaging system.

However, such an imaging system displays images on a monitor by converting images transmitted from the microscope for a medical procedure into image signals, but images to be displayed are simply displayed as 2D images.

Accordingly, there is a problem that not only operators, but assistants and watchers have difficulty in accurately observing and checking procedure parts through 2D images and the operators cannot perform a procedure through the imaging system.

Accordingly, operators have to perform a procedure while observing a diseased part through a microscope for a medical procedure, and when a long procedure is required, operators perform the procedure while seeing the microscope for a long time, so there is a problem that operators have difficulty in several respects such as feeling not only fatigue of eyes, but much physical fatigue.

Further, since stereoscopic (3D) images cannot be provided through an imaging system, the processes of procedures cannot be accurately transmitted, so there is a problem that it is difficult to sufficiently make residents who are trained, medical (dental) students, or watchers understand and observe the processes.

Accordingly, recently, 3D imaging systems that enable operators to perform procedures while seeing a diseased part and even the back of the diseased part by displaying procedure processes using 3D images are being developed.

Such 3D imaging systems are configured to be able to implement stereoscopic images (3D images) by taking and obtaining a plurality of images of a same object through a plurality of left and right separate cameras at different positions and three-dimensionally displaying the object using a disparity of the object included in the plurality of images.

However, in order to providing such 3D images, there is a need for a compound eye camera that has a plurality of imaging unit disposed with predetermined gaps, and an interface that creates 3D images from a plurality of images taken by the plurality of imaging units of the compound eye camera and displays the created 3D images on a monitor.

According to this configuration, the compound eye camera takes a plurality of images while changing the angle of view and adjusting an object into desired sizes using a zoom function with the plurality of imaging units of the compound eye camera connected to a plurality of eyepieces of a microscope for a medical procedure. Further, the plurality of images taken by the compound eye camera is converted into 3D images through the interface, whereby stereoscopic images, that is, 3D images are displayed through a monitor.

However, since the plurality of imaging units of the compound eye camera are separately connected to a plurality of eyepieces of a microscope for a medical procedure, zoom operations of the plurality of imaging units of the compound eye camera are separately adjusted to take accurate images in imaging, and in this case, the angels of view of the plurality of imaging units separated from each other are changed, but the focus between an object and lenses becomes incorrect during a zoom operation in some cases.

Further, the focuses of the plurality of imaging units of the compound eye camera are adjusted while the plurality of imaging units is synchronized with each other in a zooming operation, but there are individual differences between motors and devices for achieving the zoom functions of the imaging units, so it is difficult to take images while completely synchronizing the zoom operations of the imaging units.

Further, when a zoom operation is performed while the plurality of imaging units of the compound eye camera takes images, the focuses of the plurality of imaging units becomes different or the angles of view of the imaging units are changed, so there is a problem that the three-dimensional effect of three-dimensionally displayed images changes or is not shown during the zoom operation.

PRIOR ART DOCUMENT

Patent Document (Patent Document 1) Korean Patent No. 10-1339667 (Registration date: 2013.11.29.)
(Patent Document 2) Korean Patent Application Publication No. 10-2012-0138520 (Publication date: 2012.12.26.)
(Patent Document 3) Korean Patent No. 10-1092108 (Registration date: 2011.12.02.)

DISCLOSURE

Technical Problem

The present disclosure has been made in an effort to solve the problems described above and an objective of the present disclosure is to provide a digital microscope for a medical procedure of which the eyepieces are implemented as digital displays.

Another objective of the present disclosure is to provide a digital microscope for a medical procedure that can provide guide information for a diagnosis and a procedure to an operator by displaying various items of information required during a procedure on digital displays in real time through software.

Another objective of the present disclosure is to provide a digital microscope for a medical procedure that enables an operator to accurately figure out the three-dimensional effect of 3D images in real time without variation of the angle of view because it can remove a disparity of the taken images and the operator by collecting image information, which is input to an object lens, through both left and right cameras and outputting the image information on the left eye and right eye displays.

The objectives of the present disclosure are not limited to those described above and other objectives and advantages not stated herein may be understood through the following description and may be clear by embodiments of the present disclosure. Further, it would be easily known that the objectives and advantages of the present disclosure may be achieved by the configurations described in claims and combinations thereof.

Technical Solution

In order to achieve the objectives, a digital microscope for a medical procedure according to the present disclosure may include: image sensors 10 creating image data by processing an image of an object that is input; a lighting prism 20 transmitting an image of an object, which is input, to the image sensors such that an image is formed; pre-lenses 30 disposed in a pair at both sides behind the lighting prism 20 and enlarging an image of an object, which has passed through the lighting prism 20, with a predetermined magnification, and transmitting the image to the image sensors 10; objective lenses 40 provided in a pair, selectively disposed on virtual axes connecting the pair of pre-lenses 30 and the pair of image sensors 10, respectively, and adjusting the magnification of an object that is imaged on the image sensors 10; focus lenses 50 disposed behind the objective lenses 40 and adjusting the focus of an object by moving forward and backward along light paths in barrels; displays 60 provided in a pair and displaying composed image data by integrating image data converted through the image sensors 10 with medical information required for a diagnosis or a procedure; and an image processing unit 70 receiving image data transmitted from the image sensors 10, combining the image data with medical information transmitted from an external server, and transmitting composed image data to the displays 60.

Preferably, the image processing unit 70 may include: a communication unit 71 connecting a server in a hospital and receiving medical information of a patient who is undergoing a diagnosis or a procedure; a matching processing unit 72 checking whether a patient and medical information are matched with each other by comparing a patient of image data input from the image sensors 10 and medical information of a patient received from the communication unit 71 with each other; a composing processing unit 73 creating composed image data by combining medical information of a patient, which has been checked for matching by the matching processing unit 72, with image data input from the image sensors 10; and an image creating unit 74 creating and displaying left-eye image data and right-eye image data on the pair of displays 60 by performing convergence angle adjustment for adjusting a center and a sense of distance on the image data composed by the composing processing unit 73.

Preferably, the medical information may include at least one of a specific history and a diagnosis guide of a patient, a diseased part image before a diagnosis or a procedure, and CT and MRI data.

Advantageous Effects

The digital microscope for a medical procedure according to the present disclosure described above has the following effects.

First, it is possible to implement the eyepieces of a microscope for a medical procedure as digital displays and transmit various items of information, which are required for an operator during a procedure, in real time to the digital displays, so it is possible to increase the quality and efficiency of a diagnosis and a procedure.

Second, it is possible to provide guide information for a diagnosis and a procedure to an operator by displaying various items of information required during a procedure on digital displays in real time through software, so it is possible to increase accuracy of a procedure and provide safety for a patient.

Third, the present disclosure enables an operator to accurately figure out the three-dimensional effect of 3D images in real time without variation of the angle of view because it is possible to remove disparity of the taken images and the operator by collecting image information, which is input to object lenses, through both left and right cameras and outputting the image information on the left eye and right eye displays.

Detailed effects of the present disclosure in addition to the above effects will be described with the following detailed description for accomplishing the present disclosure.

MODE FOR INVENTION

Other objectives, characteristics, and advantages of the present disclosure will be made clear through the detailed description of embodiment referring to the accompanying drawings.

Terminologies used herein were selected as terminologies that are currently used as generally as possible in consideration of the functions herein, but may be changed, depending on the intention of those skilled in the art, precedents, or advent of a new technology. Further, there are terminologies selected by applicant(s) at the applicant(s)' opinion in specific cases, and in these cases, the meanings will be described in the corresponding parts. Accordingly, the terminologies used herein should be defined on the basis of the meanings of the terminologies and the entire specification, not simply the names of the terminologies.

Throughout the present specification, unless explicitly described otherwise, "comprising" any components will be understood to imply the inclusion of other components rather than the exclusion of any other components. Further, the terms "~part", and the like mean a unit for processing at least one function or operation and may be implemented by hardware or software or by a combination of hardware and software.

A preferred embodiment of a digital microscope for a medical procedure according to the present disclosure is described in detail hereafter with reference to the accompanying drawings. However, the present disclosure is not limited to the following embodiments and can be implemented in various ways different from one another, and the embodiments are provided to complete the present disclosure and to completely inform those skilled in art of the scope of the present disclosure. Therefore, the configurations described in the embodiments and drawings of the present disclosure are merely most preferable embodiments but do not represent all of the technical spirit of the present invention. Thus, it should be understood that the present disclosure should be construed as including all the changes, equivalents, and substitutions included in the spirit and scope of the present disclosure at the time of filing this application.

When a certain configuration is disposed "over (or under)" or "on (beneath)" of a component in the following description, it may mean not only that the certain configuration is disposed on the top (or bottom) of the component, but that another configuration may be interposed between the component and the certain configuration disposed on (or beneath) the component.

Further, when a certain component is "connected", "coupled", or "jointed" to another component, it should be understood that the components may be directly connected or jointed to each other, but another component may be "interposed" between the components or the components may be "connected", "coupled", or "jointed" through another component.

Figure 1:
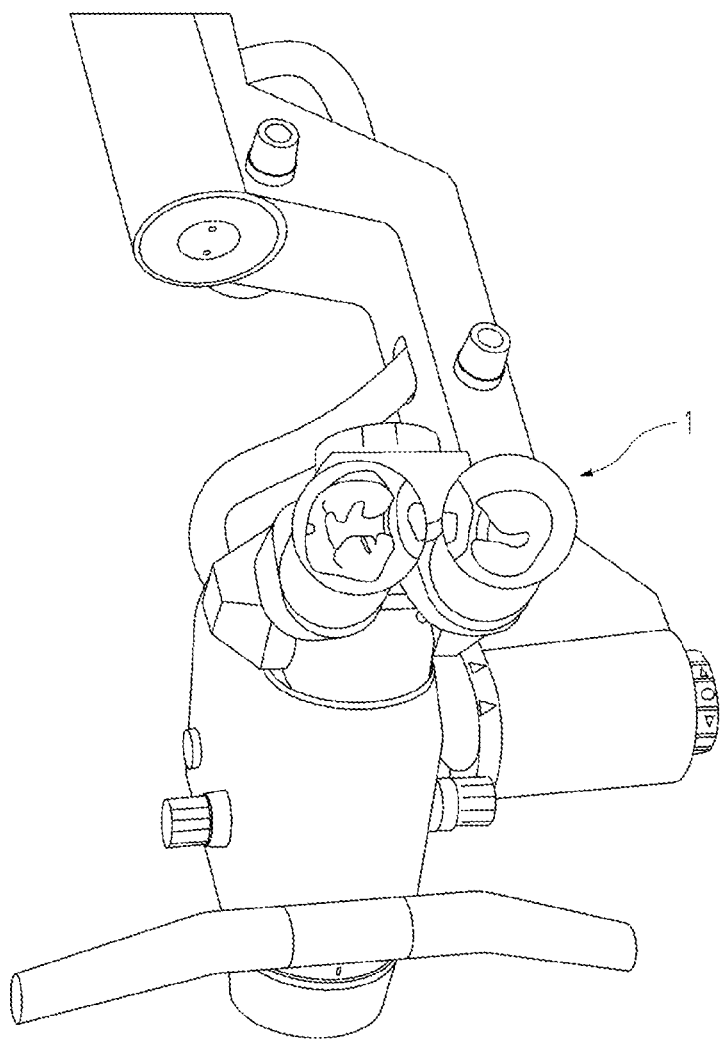
FIG. 1 is a perspective view showing the configuration of a digital microscope for a medical procedure according to an embodiment of the present disclosure.
Figure 2:
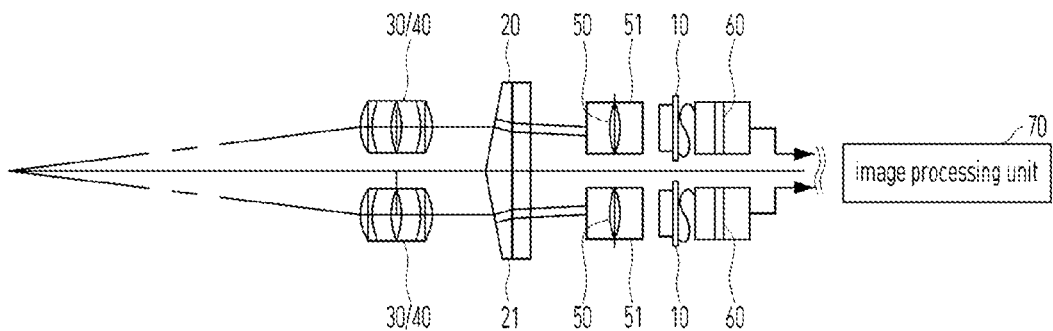
FIG. 2 is a configuration view showing the configuration of the digital microscope for a medical procedure according to an embodiment of the present disclosure.

FIG. 1 is a perspective view showing the configuration of a digital microscope for a medical procedure according to an embodiment of the present disclosure and FIG. 2 is a configuration view showing the configuration of the digital microscope for a medical procedure according to an embodiment of the present disclosure. However, the digital microscope for a medical procedure shown in FIGS. 1 and 2 is based on an embodiment, the components thereof are not limited to the embodiment shown in FIGS. 1 and 2, and if necessary, some components may be added, changed, or removed.

Referring to FIGS. 1 and 2, a digital microscope for a medical procedure 1 of the present disclosure includes image sensors 10, a lighting prism 20, pre-lenses 30, objective lenses 40, focus lenses 50, displays 60, and an image processing unit 70.

The image sensors 10 can create image data by processing images (input in the form of light) of an object that are input, and can transmit the created image data to the image processing unit 70. In this configuration, the present disclosure is a microscope that provides 3D stereoscopic images and the image sensors 10 are provided in a pair and receive and process a left eye image seeing an object (diseased part) at the right side and a left eye image seeing the object at the right side, respectively.

Meanwhile, a CCD device, a CMOS device, etc. may be used as the image sensors 10.

The lighting prism 20 can transmit an image of an object, which is input, to the image sensors 10 such that an image is formed. However, a prism has a defect that the chromatic aberration thereof is larger than that of a convex lens. That is, the difference of the refractive index of a prism according to the color (wavelength) of light as an image of an object that is input is generally larger than that of a convex lens, so a phenomenon that the surrounding of an object that is displayed looks blurred like rainbow colors is generated.

The lighting prism 20 is composed of a first prism 21 and a second prism 22 having different refractive indexes and being in close contact with each other, whereby it is possible to prevent the phenomenon that the surrounding of an object looks blurred like rainbow colors by removing chromatic aberration.

Further, in the lighting prism 20, the rear surface of the first prism 21 and the front surface of the second prism 22 are formed in flat structures and in close contact with each other, the front surface of the first prism 21 has an angular structure with a protruding center to be able to separately receive a left image and a right image, and the rear surface of the second prism 22 has an angular structure with a convex center to transmit a left image and a right image of an object, which are input to both sides of the front surface of the first prism 21, to the pair of image sensors 10, respectively.

Meanwhile, the lighting prism 20 has a focal length f suitable for procedures, and a material and angles $\theta 1$ and $\theta 2$ according to the refractive indexes of the first prism 21 and the second prism 22 are determined to remove chromatic aberration while the focal length f is implemented. In this configuration, it is preferable to reduce the size of the microscope such that the volume (particularly, the front-rear length) of the lighting prism 20, increase easiness of internal mounting, and determine the angles $\theta 1$ and $\theta 2$ that make it easy to machine the first prism 21 and the second prism 22 and prevent the first prism 21 and the second prism 22 from being easily damaged by external shock.

Further, the lighting prism 20 can move forward and backward, so it is possible to adjust the convergence angle of a 3D stereoscopic image.

The pre-lenses 30 are disposed in a pair at both sides behind the lighting prism 20, and can enlarge an image of an object, which has passed through the lighting prism 20, with a predetermined magnification and transmit the image to the image sensors 10. In this configuration, several kinds of pre-lenses 30 having different magnifications are provided, and a pair of pre-lenses 30 having magnifications that correspond to operation by a user (operator) is disposed at both sides behind the lighting prism 20.

The objective lenses 40 are provided in a pair and selectively disposed on virtual axes connecting the pair of pre-lenses 30 and the pair of image sensors 40, respectively, thereby adjusting the magnification of an object that is imaged on the image sensors 10.

In other words, when the objective lenses 40 are disposed on the virtual axes connecting the pre-lenses 30 and the image sensors 10, the objective lenses 40 enlarges an image of an object, which is transmitted from the pre-lenses 30, with a predetermined magnification and transmit the image to the image sensors 10, but when the objective lenses 40 are disposed out of the virtual axes connecting the pre-lenses 30 and the image sensors 10, an image of an object that has passed through the pre-lenses 30 is intactly transmitted to the image sensors 10, so the object is imaged on the image sensors 10 and the image is transmitted to the displays 60 with the magnification according to the pre-lenses 30.

The objective lenses 40 are rotated by rotary units (not shown), so they are disposed on or out of the virtual axes connecting the pre-lenses 30 and the image sensors 10. When a pair of objective lenses 40 is provided, as in the figures, the objective lenses 40 are rotated 90 degrees and disposed on the virtual axes, and are rotated 90 degrees in the opposite direction and disposed out of the virtual axes. When two pairs of objective lenses 40 are provided, it is possible to more variously adjust the magnification.

The focus lenses 50 are disposed behind the objective lenses 40 and can adjust the focus of an object by moving forward and backward along optical paths in barrels.

An image of an objective that has passed through the focus lenses 50 is input and formed on the image sensors 10 and the image sensors 10 convert optical data into image data as the input image of the object.

The displays 60 are provided in a pair and can display composed image data by integrating image data converted through the image sensors 10 with medical information required for a diagnosis or a procedure. In this case, the medical information required for a diagnosis or a procedure may include specific histories and a diagnosis guide of a patient, a diseased part image before a diagnosis or a procedure, CT and MRI data, etc.

The image processing unit 70 can receive image data transmitted from the image sensors 10, combine the image data with medical information transmitted from an external server, and transmit composed image data to the displays 60.

Further, the image processing unit 70 can adjust a convergence angle by adjusting the centers and the senses of distance of left-eye image data and right-eye image data for the pair of displays 60. Accordingly, the image data displayed on the displays 60 can be displayed as a stereoscopic image. That is, a left eye image and a right eye image are respectively displayed to the left eye and the right eye of an operator such that the left and right eyes of the operator can directly feel a stereoscopic image.

Figure 3:
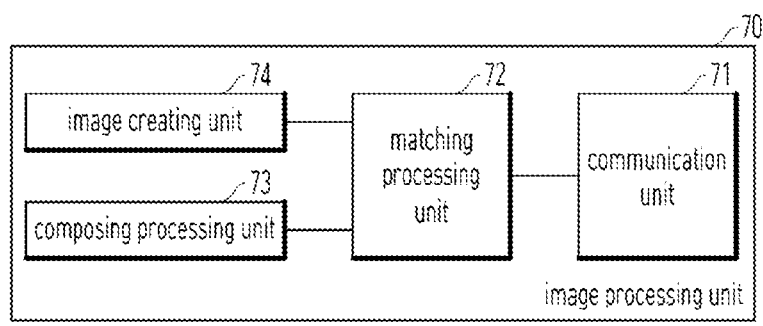
FIG. 3 is a block diagram showing in detail the configuration of an image processing unit of FIG. 2.

FIG. 3 is a block diagram showing in detail the configuration of an image processing unit of FIG. 2.

As shown in FIG. 3, the image processing unit 70 may include a communication unit 71, a matching processing unit 72, a composing processing unit 73, and an image creating unit 74.

The communication unit 71 can connect with a server (not shown) in a hospital and can receive medical information of a patient who is undergoing a diagnosis or a procedure. That is, the digital microscope for a medical procedure 1 is provided with medical information of a patient, which is stored in advance in a server in a hospital, through a communication network to be able to receive the medical information through the communication unit 71. In this case, the communication network may include wired networks such as LANs (Local Area Networks), WANs (Wide Area Networks), MANs (Metropolitan Area Networks), and ISDNs (Integrated Service Digital Networks), or wireless networks such as wireless LANs, CDMA, 5G, Bluetooth, and satellite communication, but the scope of the present disclosure is not limited thereto.

The matching processing unit 72 compares a patient of the image data input from the image sensors 10 and the medical information of a patient that is received from the communication unit 71 with each other, thereby being able to check whether it is the same patient or it is the same medical information. For example, it is possible to whether it is a medical guide according to specific histories of a patient, who is undergoing a diagnosis or a procedure, a diseased part image before a diagnosis and a procedure, CT and MRI data, or relevant data (theses, similar cases, cautions, advises of other doctors, etc.) that are matched with the corresponding diagnosis or procedure.

The composing processing unit 73 can create composed image data by combining medical information of a patient, which has been checked for matching by the matching processing unit 72, with image data input from the image sensors 10. For example, it is possible to create image data composed such that image data input from the image sensors 10 are positioned on a side and medical information of a patient is positioned on the other side by forming separate regions. However, the present disclosure is not limited thereto and it may be possible to create composed image data by overlapping image data input from the image sensors 10 and medical information of a patient with each other. In this case, it may be possible to make the medical information of a patient translucent.

The image creating unit 74 can create and display left-eye image data and right-eye image data on the pair of displays 60 by performing convergence angle adjustment for adjusting the center and the sense of distance on the image data composed by the composing processing unit 73. In this case, the image creating unit 74 can remove disparity of a taken image and an operator by outputting image data on the displays for a left eye and a right eye, so it is possible to enable the operator to accurately figure out the stereoscopic effect of a 3D image in real time without variation of the angle of view.

Figure 4:
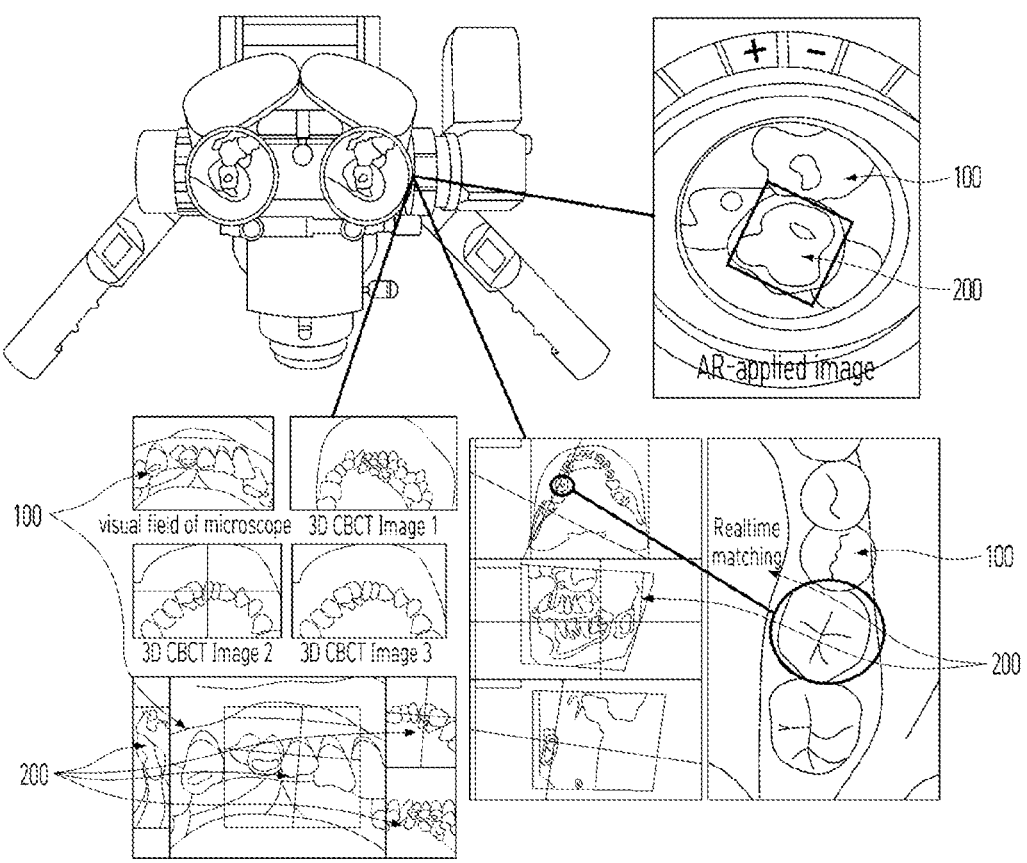
FIG. 4 is a view showing the configuration in which composed image data are displayed on a pair of displays.

FIG. 4 is a view showing the configuration in which composed image data are displayed on a pair of displays. As shown in FIG. 4, the displays 60 display composed imaged data combined with dental CBCT data 200 or test information 300 as medical information of a patient that is received from the communication unit 71 together with a procedure part including teeth 100 of the patient that are seen through the microscope for a medical procedure as image data input from the image sensors 10.

Meanwhile, in order to actually help a diagnosis, there is a need for a process of matching actual teeth with CBCT data over the technology of simply transmitting CBCT data to the displays 60 positioned in the eyepieces the microscope.

To this end, the present disclosure may be configured to be able to recognize the positions of teeth, oral tissues, etc. in an oral cavity of a patient that are moved in real time by mounting sensors at the lower portion of the microscope for a medical procedure and outside the oral cavity of the patient. Accordingly, it is possible to position CBCT data at a measured patient oral cavity position. That is, an image of a patient is taken with a sensor mounted on a tooth at the opposite side of a tooth to be treated when the patient initially undergoes CBCT, and the positions of teeth in the oral cavity of the patient are specified by designating the sensor as a reference point, whereby it is possible to position CBCT data at the patient oral cavity position.

As another method, when devices through which a minute current can flow are mounted at both ends of teeth in an oral cavity, it is possible to make a current flow by considering the teeth as a condenser and use the current at reference points by dividing it in the unit of dot.

As another method, an image recognized on the objective lenses 40 of the microscope for a medical procedure is input to the image processing unit 70 in the microscope and then the numbers and positions of teeth in an oral cavity are recognized in real time using an artificial intelligence-based object recognition technology (machine learning or deep learning), and accordingly, it is possible to position CBCT data to a measured patient oral cavity position by transmitting CBCT data of a tooth that is operated on to the digital eyepieces for an operator.

By this configuration, the microscope for a medical procedure of the present disclosure can transmit medical information of a patient that is required in real time for an operator even during a diagnosis or a procedure. Accordingly, operators have to perform a diagnosis or a procedure while memorizing CT/MRI medical data taken in advance in the related art, but the configuration of the present disclosure has an effect that operators can more easily and stably perform a diagnosis and a procedure because they can accurately figure out even necessary medical information together with a diseased part in real time.

Meanwhile, all of documents that include published documents, patent applications, patents, etc. cited in the disclosed embodiment may be combined with the disclosed embodiment the same as those represented individually or in combination in detail by the individual cited documents or that represented in combination by the entire of the disclosed embodiment.

For understanding of the disclosed embodiment, reference numerals were represented in preferred embodiments shown in the drawings and specific terms were used to describe the disclosed embodiments, but the disclosed embodiments are not limited to the specific terms and may include all of components that those skilled in the art can generally think of.

Furthermore, wire connection and connecting members of components shown in the figures are examples of functional connection and/or physical or circuit connections, and in actual devices, they may be replaceable or may be shown as various additional functional connection, physical connection, or circuit connection. Further, unless stated in detail such as "necessary" and "important", they may not be necessary component for applying the disclosed embodiments.

Further, it should be noted that the present invention may be achieved in various ways by those skilled in the art without departing from the scope of the present invention. Therefore, the technical protective region of the present disclosure should be determined by the scope described in claims.

[Description of Reference Numerals]

| | |
|---|---|
| 1: digital microscope for medical procedure | 10: image sensor |
| 20: lighting prism | 30: pre-lens |
| 40: objective lens | 50: focus lens |
| 60: display | 70: image processing unit |
| 71: communication unit | 72: matching processing unit |
| 73: composing processing unit | 74: image creating unit |

The invention claimed is:

1. A digital microscope for a medical procedure on a patient, comprising:
   image sensors (10) configured to capture a left-eye image and a right-eye image of an object and generate image data;
   a lighting prism (20) arranged to be movable forward and backward along an optical path and adapted to split an incoming image of object into the left-eye image and the right-eye image, and direct the images to the image sensors such that respective images are formed on the image sensors;
   pre-lenses (30) disposed in a pair at both sides behind the lighting prism (20), each pre-lens enlarging the image from the lighting prism with a predetermined magnification and transmitting the enlarged image to a corresponding one of the image sensors (10);
   objective lenses (40) provided as two or more pairs arranged at angular intervals of 60 degrees, the objective lenses of each pair being selectively positionable on imaginary axes connecting the pair of pre-lenses (30) to the pair of image sensors (10), respectively, to adjust a magnification of the object image on the image sensors;
   focus lenses (50) disposed behind the objective lenses (40), each focus lens moving forward and backward along a light path within a barrel to adjust focus of the object image on the corresponding image sensor;
   displays (60) provided in a pair and implemented as digital displays in place of eyepieces, each display being configured to present, in real time, composed stereoscopic image derived from integrating the image data from the image sensors (10) with patient-specific medical information required for the diagnosis or procedure; and
   an image processing unit (70) operatively coupled to the image sensors (10) and the displays (60), the image processing unit being configured to receive the image data from the image sensors, retrieve medical information of the patient from a server in a hospital via a communication connection, verify whether the image data corresponds to the same patient as the medical information, combine the image data with the medical information upon confirming a match to generate composed image data, and output stereoscopic composed image data including separate left-eye and right-eye components to the pair of displays (60) for three-dimensional visualization,
   wherein
   the lighting prism (20) comprises a first prism (21) and a second prism (22) having different refractive indexes, and the prisms are joined such that a rear surface of the first prism (21) and a front surface of the second prism (22) are flat and in intimate contact,
   a front surface of the
      first prism (21) has an angular structure with a protruding center region configured to separately receive the left-eye image and the right-eye image of the object, and
      a rear surface of the second prism (22) has an angular structure with a convex center region configured to direct the left-eye image and the right-eye image, which enter through opposite sides of the front surface of the first prism (21), to the respective sensors (10),
   wherein the image processing unit (70) consists of:
      a communication unit (71) configured to connect to the server in the hospital and receive the medical information of the patient who is undergoing the diagnosis or procedure;
      a matching processing unit (72) configured to compare the image data from the image sensors (10) with the medical information of the patient received via the communication unit (71), and to determine whether the image data and the medical information correspond to the same patient,
      a composing processing unit (73) configure to create composed image data by combining the medical information of the patient, upon confirmation of a match by the matching processing unit (72), with the image data from the image sensors (10); and
      an image creating unit (74) configured to perform a convergence angle adjustment on the composed image data to align image centers and adjust perceived depth, thereby generating left-eye image data and right-eye image data, and to output the left-eye image data and the right-eye image data to the pair of displays (60) for stereoscopic display.

2. The digital microscope of claim 1, wherein the medical information comprises a diagnosis guide for the patient and at least one of the following: a specific medical history of the patient, an image of a diseased part of the patient obtained prior to the diagnosis or procedure, a CT image of the patient, and an MRI image of the patient.

* * * * *